(12) United States Patent
Tomozawa et al.

(10) Patent No.: US 8,714,635 B2
(45) Date of Patent: May 6, 2014

(54) FRONT BODY OF VEHICLE

(75) Inventors: Kosaku Tomozawa, Wako (JP); Yushi Nakao, Wako (JP)

(73) Assignee: Honda Motor Co., Ltd, Tokyo (JP)

( * ) Notice: Subject to any disclaimer, the term of this patent is extended or adjusted under 35 U.S.C. 154(b) by 104 days.

(21) Appl. No.: 13/358,953

(22) Filed: Jan. 26, 2012

(65) Prior Publication Data

US 2012/0187724 A1 Jul. 26, 2012

(30) Foreign Application Priority Data

Jan. 26, 2011 (JP) ................................. 2011-014204

(51) Int. Cl.
*B62D 25/08* (2006.01)
(52) U.S. Cl.
USPC ...................................... 296/193.09; 296/204
(58) Field of Classification Search
USPC ................... 296/204, 193.09, 203.02, 187.04, 296/193.1; 293/115; 180/68.6
See application file for complete search history.

(56) References Cited

U.S. PATENT DOCUMENTS

| | | | |
|---|---|---|---|
| 6,679,523 B2 * | 1/2004 | Yamamoto et al. | 280/785 |
| 6,773,057 B2 * | 8/2004 | Nomura | 296/198 |
| 7,213,873 B2 * | 5/2007 | Murata et al. | 296/204 |
| 7,216,924 B2 * | 5/2007 | Li et al. | 296/187.12 |
| 7,441,830 B2 * | 10/2008 | Caliskan et al. | 296/204 |
| 7,441,831 B2 * | 10/2008 | Caliskan et al. | 296/205 |
| 7,556,310 B2 * | 7/2009 | Miki | 296/204 |
| 7,815,251 B2 * | 10/2010 | Kim | 296/204 |
| 7,854,474 B2 * | 12/2010 | Cox | 296/204 |

FOREIGN PATENT DOCUMENTS

| | | |
|---|---|---|
| JP | 04-059578 U | 5/1992 |
| JP | 2003-127893 A | 5/2003 |
| JP | 2004-243785 A | 9/2004 |
| JP | 2009-220754 A | 10/2009 |
| JP | 2010-530821 A | 9/2010 |

OTHER PUBLICATIONS

Japanese Office Action dated Jan. 22, 2013, issued in corresponding Japanese Patent Application No. 2011-014204, w/ English translation (6 pages).

* cited by examiner

*Primary Examiner* — Glenn Dayoan
*Assistant Examiner* — Sunsurraye Westbrook
(74) *Attorney, Agent, or Firm* — Westerman, Hattori, Daniels & Adrian, LLP

(57) ABSTRACT

A front body of a vehicle includes left and right front side frames and a subframe attached to the front side frames. The subframe includes front arm connecting parts and rear arm connecting parts configured to support lower arms of respective suspensions at left and right ends of the subframe, an engine contact part disposed in an upper part of the subframe and facing toward an engine, and rear fastening parts each disposed in a continuous part between the engine contact part and the corresponding rear arm connecting part and fastened to the corresponding front side frame. The rear fastening parts each are formed in a branch part disposed between the corresponding rear arm connecting part and the engine contact part and protruding from a rear branch member toward the rear of the vehicle.

5 Claims, 16 Drawing Sheets

FRONT BODY OF VEHICLE

CROSS REFERENCES TO RELATED APPLICATIONS

The present application claims priority under 35 U.S.C. §119 to Japanese Patent Application No. 2011-014204, filed Jan. 26, 2011, entitled "Front Body of Vehicle". The contents of this application are incorporated herein by reference in their entirety.

FIELD OF THE INVENTION

The present invention relates to a front body of a vehicle in which lower arms that support respective front wheels are connected to left and right ends of a subframe in front of a floor of a cabin, so that shocks (loads) input to the front of the vehicle are absorbed by the subframe.

BACKGROUND OF THE INVENTION

For example, there is a front body of a vehicle in which when a shock (load) is input to the front of the vehicle, the retraction of a suspension member (subframe) is suppressed by turning the suspension member about a supporting part. The suspension member is substantially rectangular in plan view of the vehicle. A left member and a right member of the suspension member are joined to respective side members along front wheels, and are connected to respective lower arms. Then, for example, if a shock is input from the front of the vehicle to the lower arm on the left, the left member is turned (clockwise) about a rear connecting part of the left member while being bent inward, so that a rear member extending continuously from the left member is bent (see, e.g., Japanese Unexamined Patent Application Publication No. 2009-220754).

However, in the related art (Japanese Unexamined Patent Application Publication No. 2009-220754), where the left and right members and the rear member joined thereto are configured to be deformed and bent, the strength of the suspension member is small. Since this makes it difficult to transmit a large shock from the suspension member through supporting bolts to the vehicle body (including the side members) supported by the suspension member, a relatively large shock is unable to be absorbed by the suspension member.

SUMMARY OF THE INVENTION

The present invention provides a front body of a vehicle, the front body being capable of absorbing shocks (loads) input to the front of the vehicle.

According to a first aspect, a front body of a vehicle includes left and right front side frames extending continuously to a cabin of the vehicle; and a subframe disposed in front of a floor of the cabin, extending to the left and right, and attached to the front side frames. The subframe includes front arm connecting parts and rear arm connecting parts configured to support lower arms of respective suspensions at left and right ends of the subframe, an engine contact part disposed in an upper part of the subframe and facing toward an engine inside the front body, and rear fastening parts each disposed between the engine contact part and the corresponding rear arm connecting part and fastened to the corresponding front side frame.

With this configuration, if the engine is retracted and brought into contact with the engine contact part by a shock (load) input to the front of the vehicle, the load is transmitted (clockwise and counterclockwise) to both sides of each rear fastening part of the subframe (i.e., to the outside in the radial direction of each fastening bolt), so that forces that turn the rear fastening part are cancelled out.

Thus, the rear fastening part is not turned about the axis of the bolt that fastens the rear fastening part. Therefore, since the vicinity of the rear fastening part is deformed to bend the upper surface of the subframe into a V shape, the rear fastening part bends the bolt and even shears it if the load is large.

That is, since the turning forces are cancelled out and the bolt can continue to generate a reactive force until being sheared, it is possible to absorb the shock (load) by deforming the subframe and each lower shock-absorbing beam extending from the subframe to the front.

Then, when the bolt is eventually broken, the subframe is retracted toward a front wall (dashboard lower panel) of the cabin. However, since the shock (load) has already been absorbed, the front wall is not deformed or the deformation of the front wall can be suppressed. That is, it is possible to prevent the front wall from being pushed into the cabin.

According to a second aspect, the front side frames may include respective frame fastening parts to which the respective rear fastening parts are fastened, the frame fastening parts being connected to respective branched parts extending to the left and right of the vehicle.

With this configuration, where a shock (load) is distributed to the branched parts, it is possible to improve the strength of the frame fastening parts and allow the branched parts and the retracted rear fastening parts to easily break the bolts.

According to a third aspect, the subframe may include a transverse member extending to the left and right in plan view of the vehicle, and a front branch member and a rear branch member extending from each of the left and right ends of the transverse member, the front branch member and the rear branch member extending to the front and rear, respectively, of the vehicle to form a Y shape. Each of the rear arm connecting parts may be formed in the rear branch member. Each of the rear fastening parts may be formed in a branch part disposed between the corresponding rear arm connecting part and the engine contact part and protruding from the rear branch member toward the rear of the vehicle.

Thus, each of the rear fastening parts can be placed between the corresponding rear arm connecting part and the engine contact part on the transverse member.

According to a fourth aspect, in the subframe, a height of a cross section of the rear fastening parts may be lower than a height of a cross section of the rear arm connecting parts.

This provides an advantage of facilitating generation of a force that bends the vicinity of each of the rear fastening parts.

According to a fifth aspect, the frame fastening part of each of the front side frames may be supported by a collar nut vertically placed on a bracket outside the front side frame, the collar nut being passed through a front floor frame above the bracket and a stiffener inside the front side frame.

This configuration has the advantages of improving the strength that supports the collar nut and making it easy to bend and break the middle of the bolt located between the collar nut and the rear fastening part.

BRIEF DESCRIPTION OF THE DRAWINGS

The advantages of the invention will become apparent in the following description taken in conjunction with the drawings, wherein:

FIG. 14A illustrates the subframe before input of a shock, and FIG. 14B illustrates the subframe after input of a shock;

FIG. 15A is a perspective view of the front body before input of a shock, FIG. 15B illustrates the front body as viewed in the direction of arrow XVB of FIG. 15A, FIG. 15C is a perspective view of the front body after input of a shock, and FIG. 15D illustrates the front body as viewed in the direction of arrow XVD of FIG. 15C; FIG. 16A is a bottom view of a comparative example and FIG. 16B is a bottom view of the embodiment.

DETAILED DESCRIPTION OF THE INVENTION

Embodiments of the present invention will now be described in detail.

Figure 1:
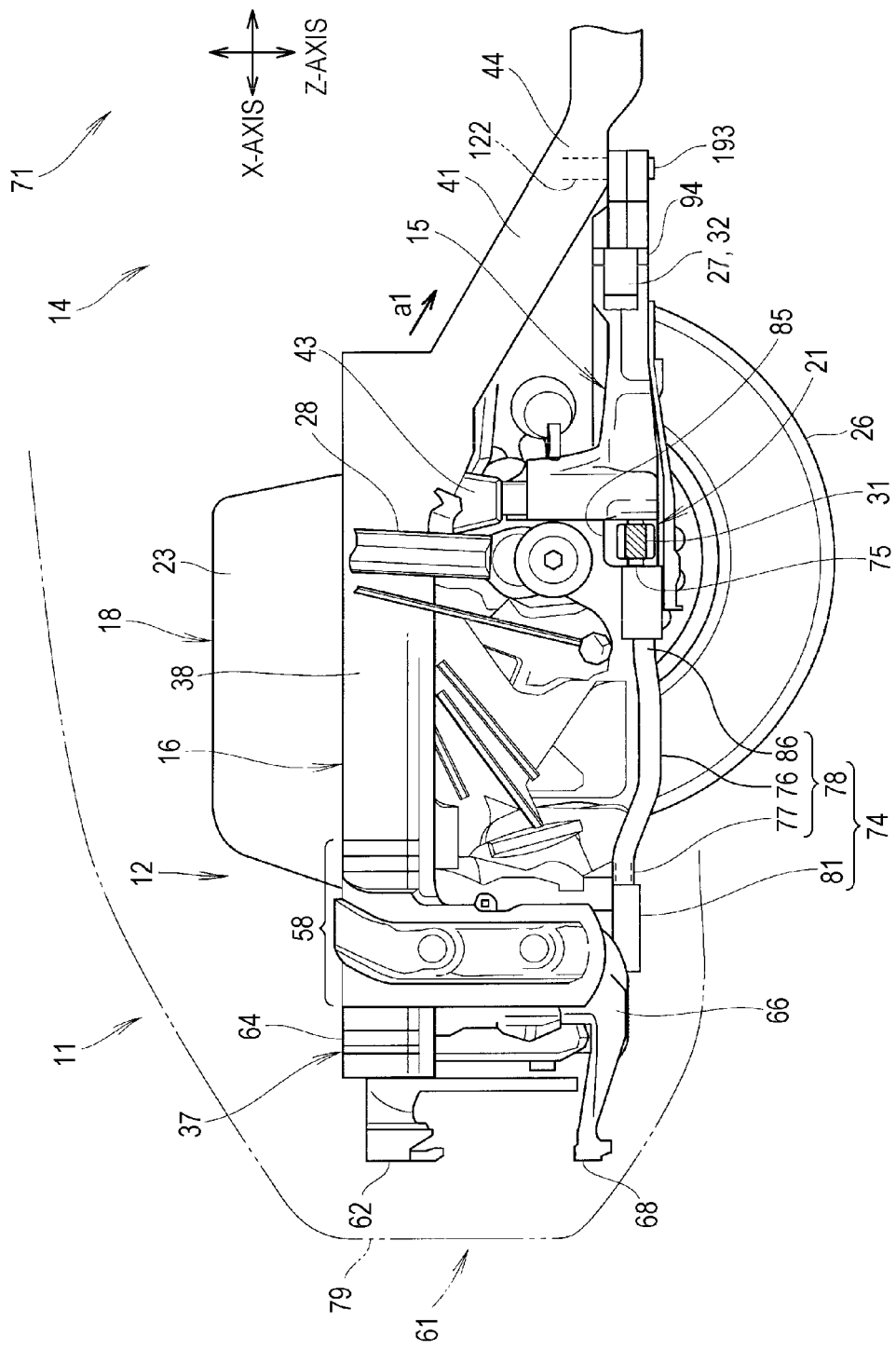
FIG. 1 is a cross-sectional view illustrating an overall configuration of a vehicle.
Figure 2:
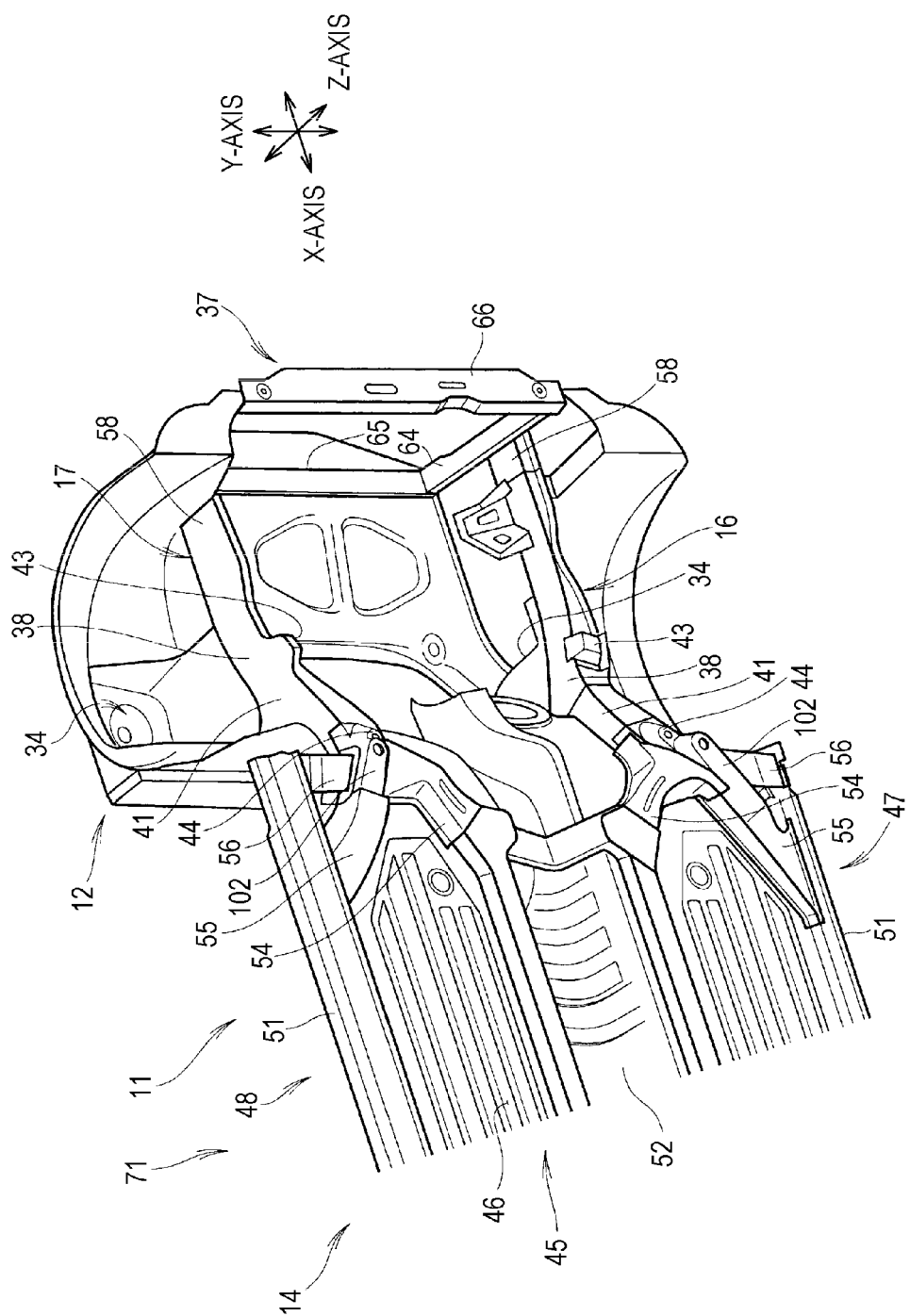
FIG. 2 is a perspective view of a front body as viewed from the bottom right of the vehicle.
Figure 3:
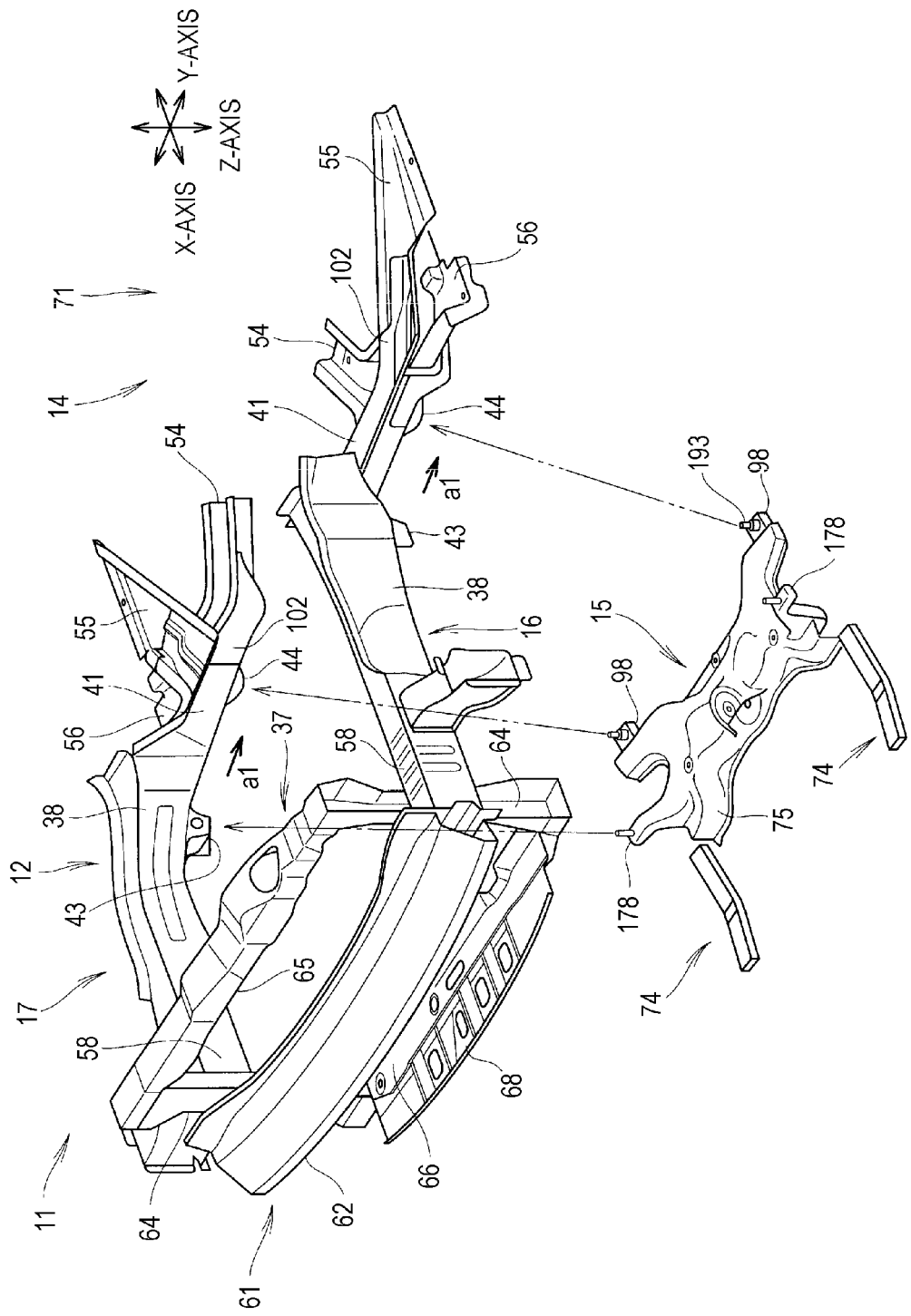
FIG. 3 is an exploded perspective view of the front body.

As illustrated in FIG. 1 to FIG. 3, a vehicle 11 has a front body 12 according to an embodiment. The front body 12 is a front part of a vehicle body 14 and includes a subframe 15. The subframe 15 and left and right front side frames 16 and 17 are configured to hold an engine 18 thereon and support front suspensions 21.

The front-rear direction of the vehicle 11 is defined as an X-axis direction, the left-right direction (vehicle width direction) of the vehicle 11 is defined as a Y-axis direction, and the up-down direction of the vehicle 11 is defined as a Z-axis direction. Note that the left-right direction is defined with respect to a driver of the vehicle 11, and that the right side of the driver sitting in the driver's seat and facing the front is referred to as "right".

Figure 5:
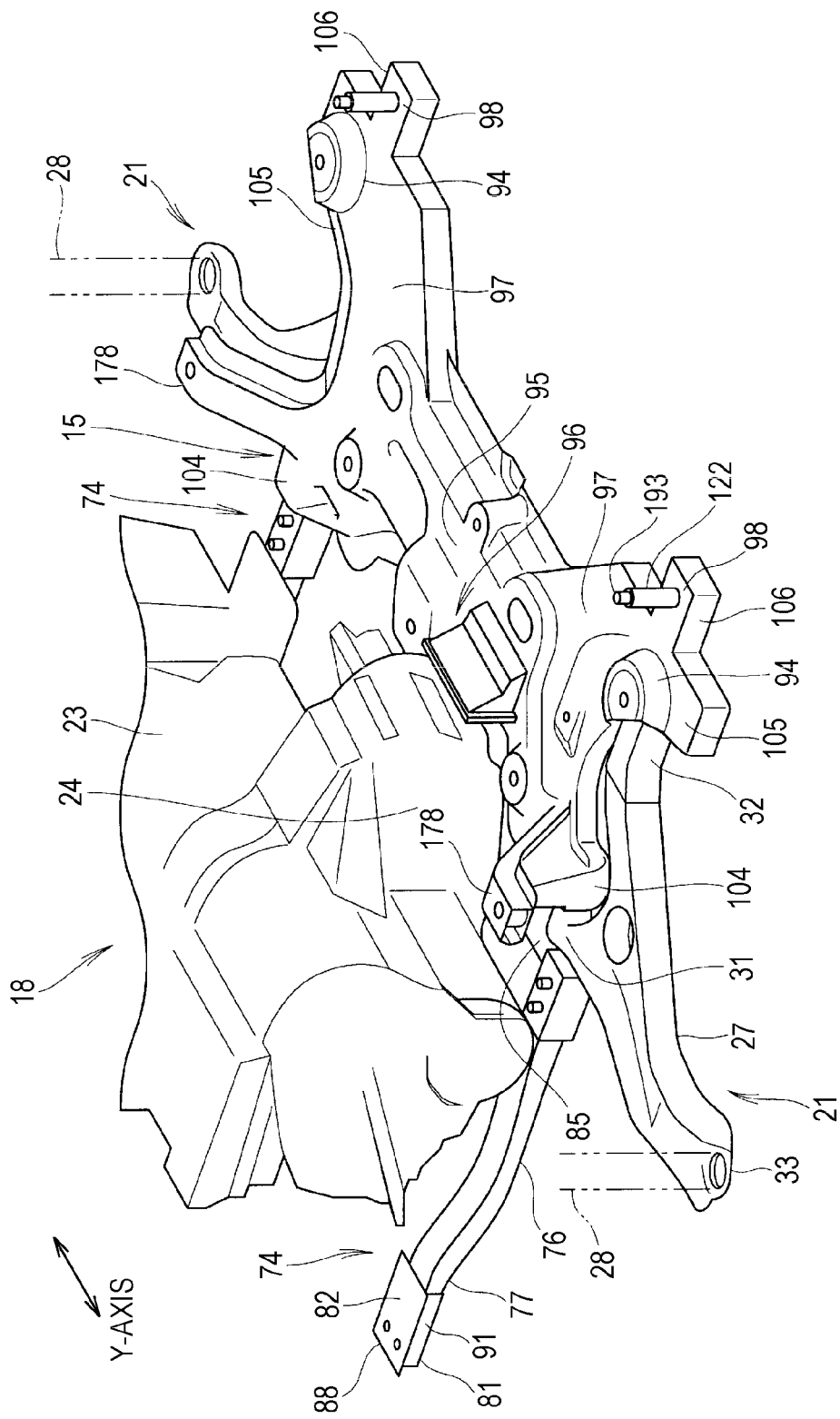
FIG. 5 is a perspective view of a subframe and side beams according to the embodiment.
Figure 6:
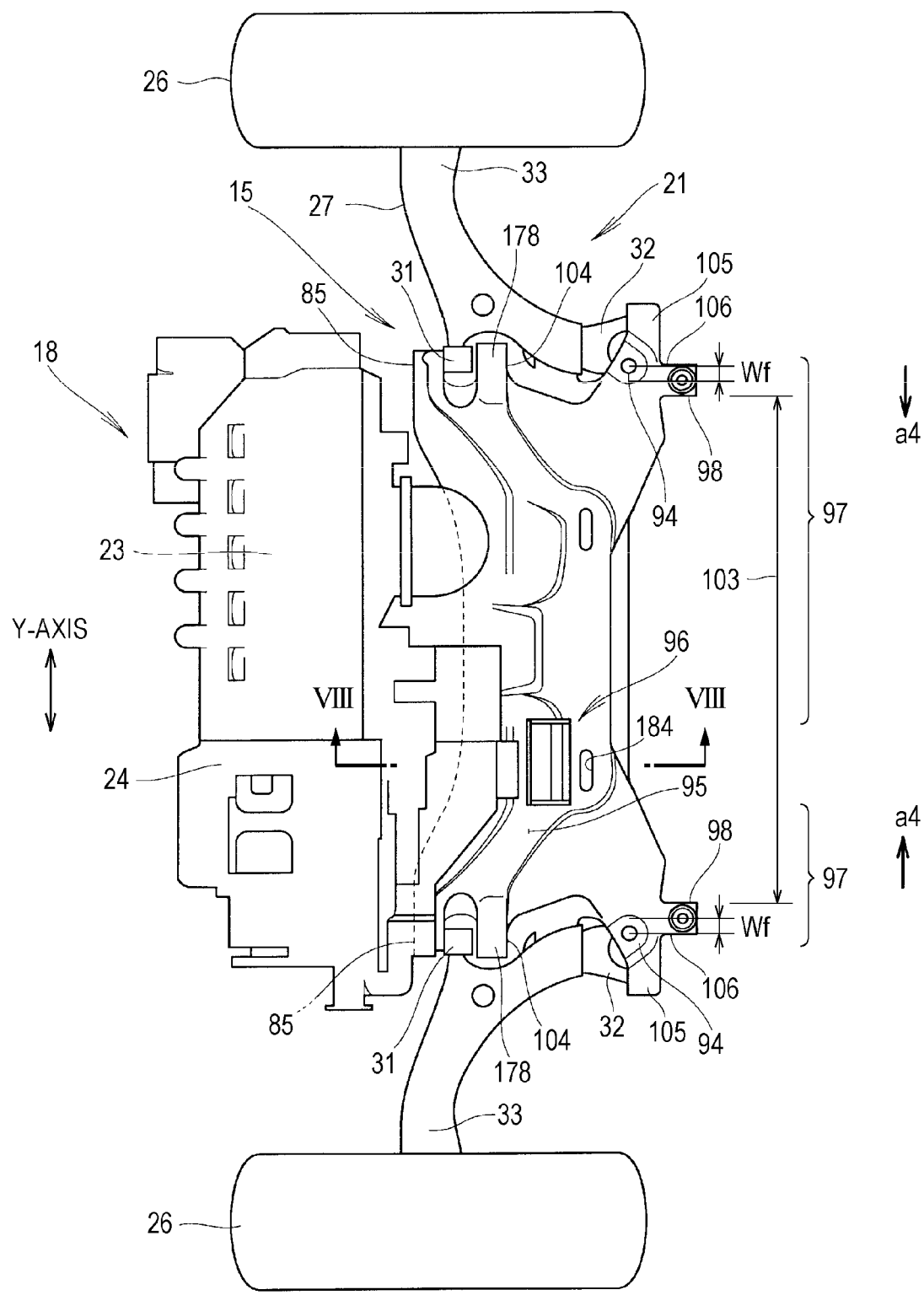
FIG. 6 is a plan view of the subframe.

As illustrated in FIG. 1, FIG. 5, and FIG. 6, the engine 18 is, for example, a transverse engine (along the Y-axis direction) which has an engine body 23 on the right and a transmission 24 on the left. The transmission 24 is connected to the engine body 23.

As illustrated in FIG. 1, FIG. 5, and FIG. 6, the front suspensions 21 are MacPherson strut suspensions having respective lower arms 27 and dampers (struts) 28. The lower arms 27 are configured to support respective front wheels 26. The dampers 28 are vertically mounted at lower ends thereof on the respective lower arms 27.

The lower arms 27 are solid casts of iron (steel) or aluminum alloy. The lower arms 27 are higher in strength than the subframe 15 made of steel plates. The lower arms 27 each have a front connecting end 31 and a rear connecting end 32 connected to the subframe 15, and an end link 33 connected to the lower end of the corresponding damper 28 that supports the front wheel 26. The upper ends of the dampers 28 are fastened to respective damper housings 34 (see FIG. 2) of the front body 12.

The front body 12 includes the left and right front side frames 16 and 17, a front frame part (bulkhead) 37 attached to the front ends of the front side frames 16 and 17, and the damper housings 34 standing on the respective front side frames 16 and 17.

As illustrated in FIG. 1 to FIG. 4, the front side frames 16 and 17 each have a substantially horizontal frame body 38 and a front floor frame 41 that obliquely extends downward from the frame body 38 toward the rear (in the direction of arrow a1). The subframe 15 is fastened from below to a front frame fastening part 43 and a rear frame fastening part 44 at the front and rear, respectively, of each front floor frame 41. Thus, the front floor frames 41 and the subframe 15 are integrally joined to an underbody (floor) 45.

Figure 4:
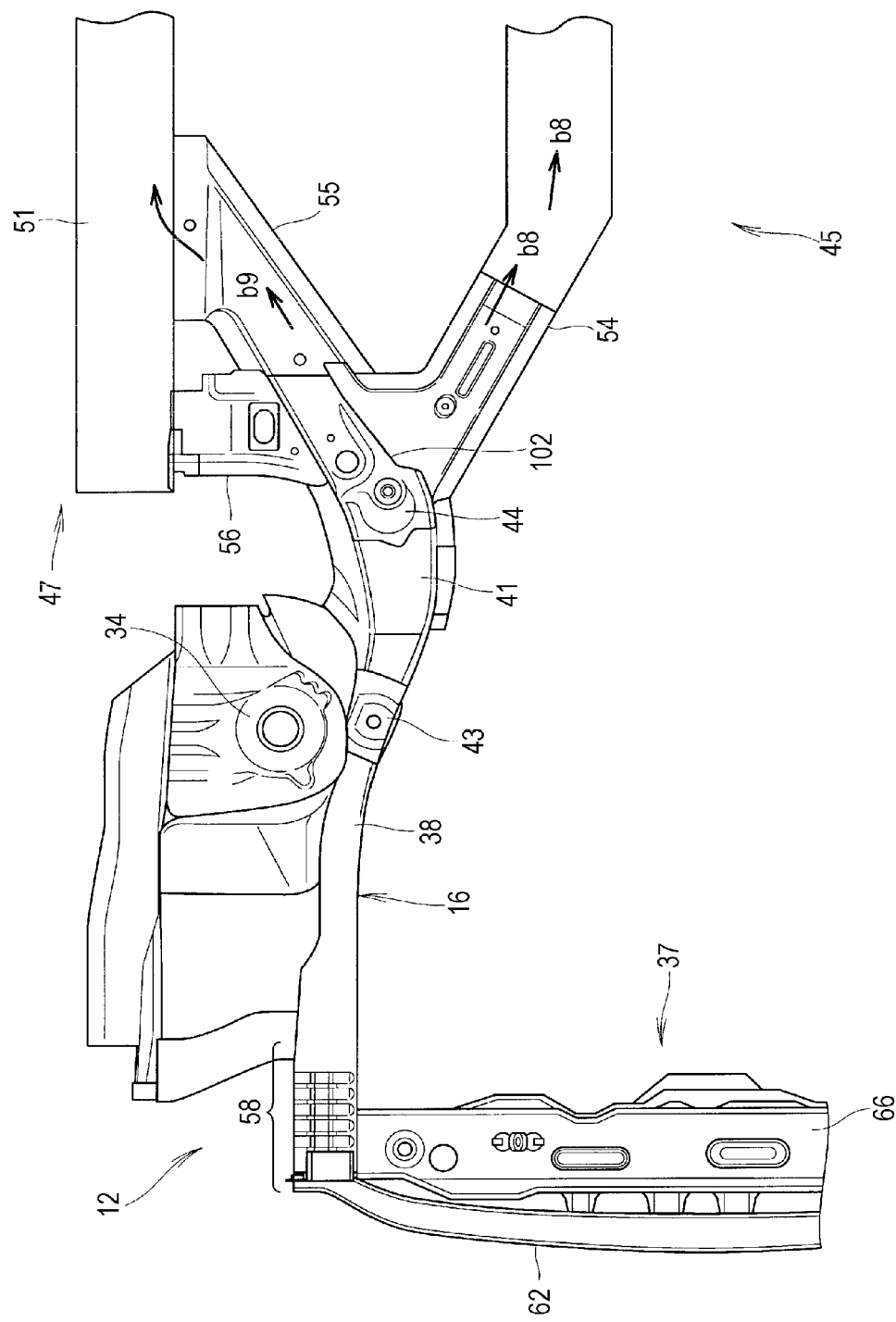
FIG. 4 is a bottom view of a left part of the front body.

As illustrated in FIG. 2, the left and right ends of a front floor panel 46 of the underbody 45 are joined to respective side sills 51 of left and right side bodies 47 and 48. The underbody 45 includes the front floor panel 46; a tunnel 52 in the center of the front floor panel 46 in the left-right direction; and a floor center frame 54, a floor frame 55, and an outrigger 56 that extend from each of the front floor frames 41 as illustrated in FIG. 2 to FIG. 4. The rear ends of the floor frames 55 and the outer ends of the outriggers 56 are joined to the side sills 51 in the rear of the left and right front side frames 16 and 17.

The front side frames 16 and 17 each have a front shock absorber 58 at the front of the frame body 38. A bumper beam 62 of a bumper 61 is attached to the front shock absorbers 58, which directly absorb a shock (load) input to the bumper beam 62.

The bumper beam 62 is directly fastened to the front ends of the front shock absorbers 58. In other words, between the bumper beam 62 and the front side frames 16 and 17, there is nothing which absorbs a shock (load) input to the bumper beam 62.

The front frame part 37 is attached to the inner sides of the front shock absorbers 58. The front frame part 37 includes front side bulkheads 64 standing on the left and right front side frames 16 and 17, a bulkhead upper frame 65 joined to upper parts of the front side bulkheads 64, and a front bulkhead lower cross-member 66 joined to lower parts of the front side bulkheads 64. A sweeper plate 68 is joined to the front bulkhead lower cross-member 66.

An overview of the front body 12 will now be described with reference to FIG. 1 to FIG. 13.

The front body 12 is formed by attaching the subframe 15 to the left and right front side frames 16 and 17 that extend continuously to a cabin 71 of the vehicle 11. The subframe 15 is disposed in front of the underbody 45 of the cabin 71 and extends to the left and right.

The front body 12 includes side beams 74 that extend from the subframe 15 to the front frame part 37 of the front body 12. The side beams 74 are joined to a front wall 75 of the subframe 15 that faces toward the front of the vehicle 11. As illustrated in FIG. 1, the side beams 74 each have a lower shock-absorbing beam 78 and a shock absorbing member 81. The lower shock-absorbing beam 78 has a curved portion 76 formed by lowering the middle of the lower shock-absorbing beam 78 toward the bottom of the vehicle 11, and a horizontal linear portion 77 extending continuously from the curved portion 76. The shock absorbing member 81 is joined to the horizontal linear portion 77 and to the front frame part 37. The shock absorbing member 81 is compressed and deformed by an input from a front 79 of the vehicle 11.

An upper surface 82 (see FIG. 5) of each shock absorbing member 81 is connected to a lower surface of the front frame part 37. As viewed from a side of the vehicle 11 (i.e., as viewed as in FIG. 1), the shock absorbing member 81 extends to the front and rear of the vehicle 11 and is positioned above the curved portion 76 of the lower shock-absorbing beam 78.

The subframe 15 has the front wall 75 and front arm connecting parts 85 that extend continuously from the front wall 75. As illustrated in FIG. 6, the lower arms 27 of the front suspensions 21 are supported at the left and right ends of the front arm connecting parts 85. A rear portion 86 (see FIG. 1) of each lower shock-absorbing beam 78 is connected to the front wall 75 from which the front arm connecting parts 85 extend.

The shock absorbing members 81 have a closed cross-sectional shape. The shock absorbing members 81 each have a plate-like top portion 88 (see FIG. 5) facing toward the top of the vehicle 11, and a substantially U-shaped absorbing frame portion 91 joined to the top portion 88 and protruding toward the bottom of the vehicle 11. Each lower shock-absorbing beam 78 is inserted into and joined to the interior of the corresponding shock absorbing member 81 (see FIG. 1).

A main configuration of the front body 12 will now be described with reference to FIG. 1 to FIG. 13.

As illustrated in FIG. 5 and FIG. 6, the subframe 15 of the front body 12 includes the front arm connecting parts 85 and rear arm connecting parts 94 configured to support the lower arms 27 of the front suspensions 21 at the left and right ends of the subframe 15; an engine contact part 96 disposed in an upper part 95 of the subframe 15 and facing toward the engine 18 inside the front body 12; and rear fastening parts 98 each disposed between the engine contact part 96 and the corresponding rear arm connecting part 94 (i.e., disposed in a continuous part 97 of FIG. 5), the rear fastening parts 98 being fastened to the respective front side frames 16 and 17.

As illustrated in FIG. 2 and FIG. 4, the rear frame fastening parts 44 of the front side frames 16 and 17 to which the respective rear fastening parts 98 are fastened are connected to respective branched parts 102 that extend to the left and right of the vehicle 11 (in the Y-axis direction).

As illustrated in the plan view of FIG. 6, the subframe 15 includes a transverse member 103 extending to the left and right of the vehicle 11 (in the Y-axis direction), front branch members 104, and rear branch members 105. From each of the left and right ends of the transverse member 103, each of the front branch members 104 and the corresponding rear branch member 105 extend to the front and rear, respectively, of the vehicle 11 to form a Y shape.

The rear arm connecting parts 94 are formed in the respective rear branch members 105. The rear fastening parts 98 are formed in respective branch parts 106 each disposed between each of the rear arm connecting parts 94 and the engine contact part 96 and protruding from the corresponding rear branch member 105 toward the rear of the vehicle 11.

Figure 7A:
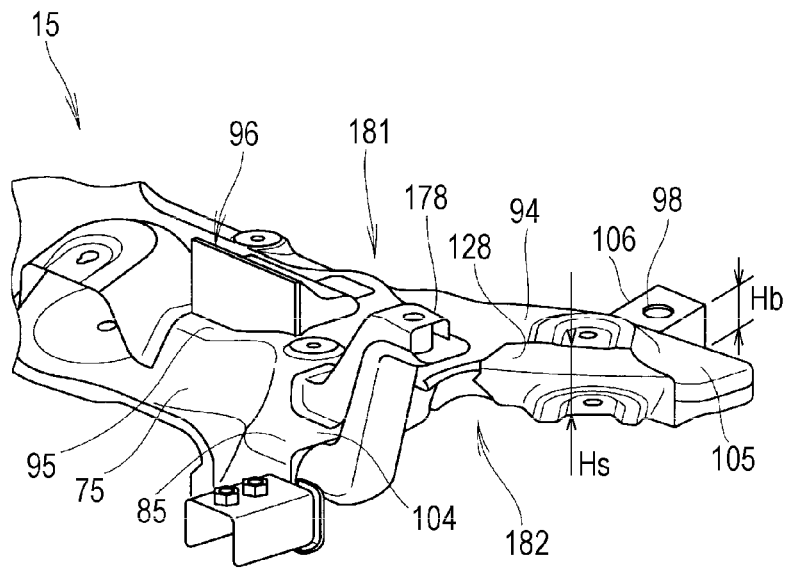
FIG. 7A and FIG. 7B are a detailed view and an exploded view, respectively, of a left part of the subframe.
Figure 15A:
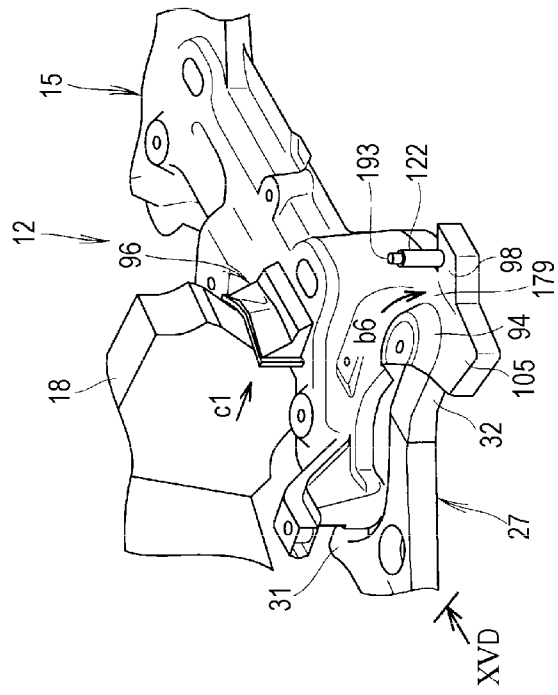
FIG. 15A to FIG. 15D illustrates the shock absorbing mechanism of the front body.
Figure 15B:
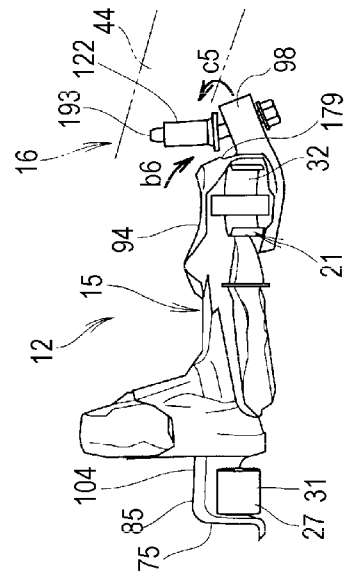

As illustrated in FIG. 7A and FIG. 15B, the height Hb of a cross section of the rear fastening part 98 is lower than the height Hs of a cross section of the rear arm connecting part 94. Note that "height Hb of a cross section of the rear fastening part 98" means height Hb of the rear fastening part 98, and "height Hs of a cross section of the rear arm connecting part 94" means height Hs of the rear arm connecting part 94.

Figure 11:
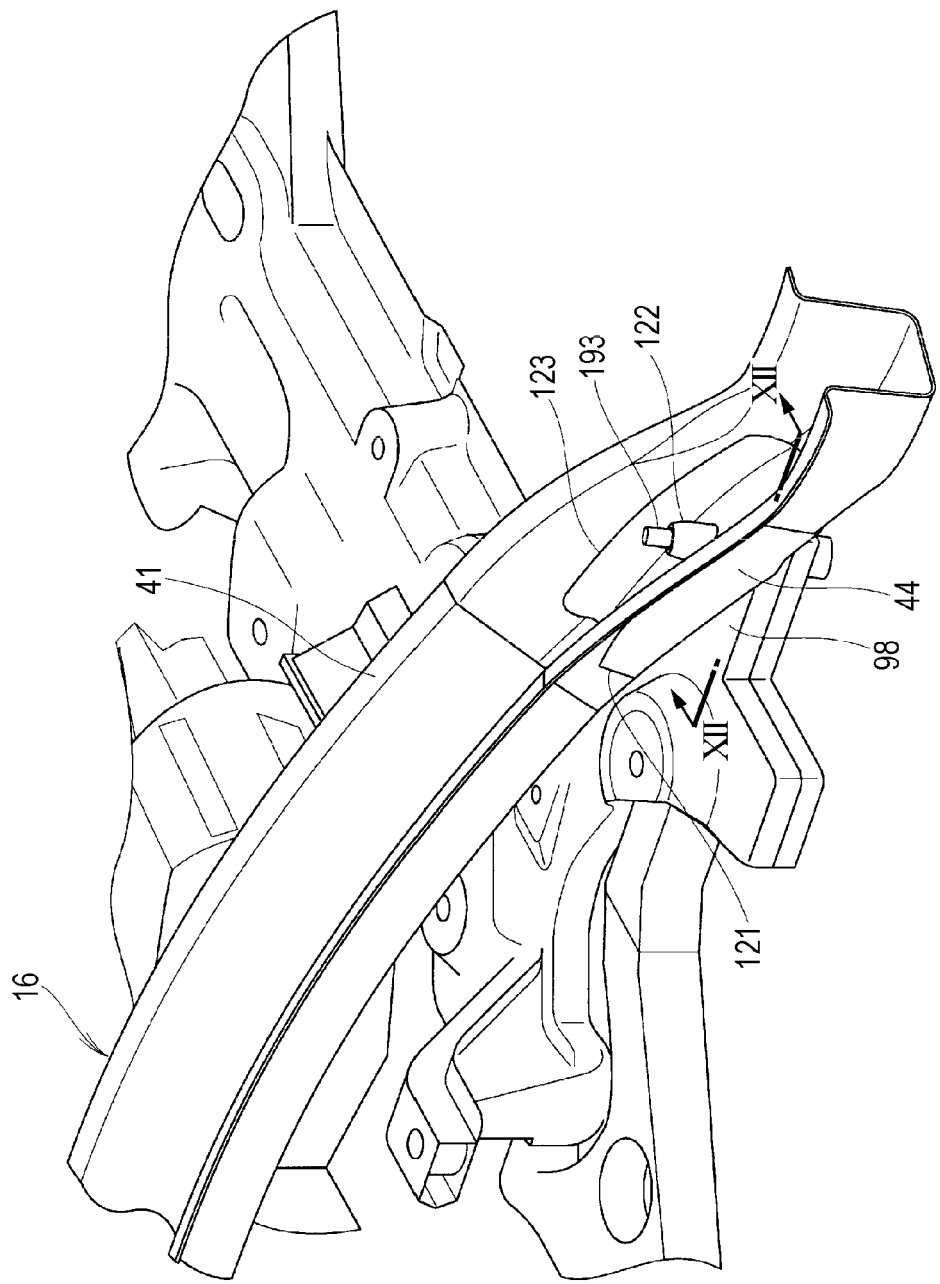
FIG. 11 is a perspective view of a rear fastening part fastened to a front side frame.
Figure 12:
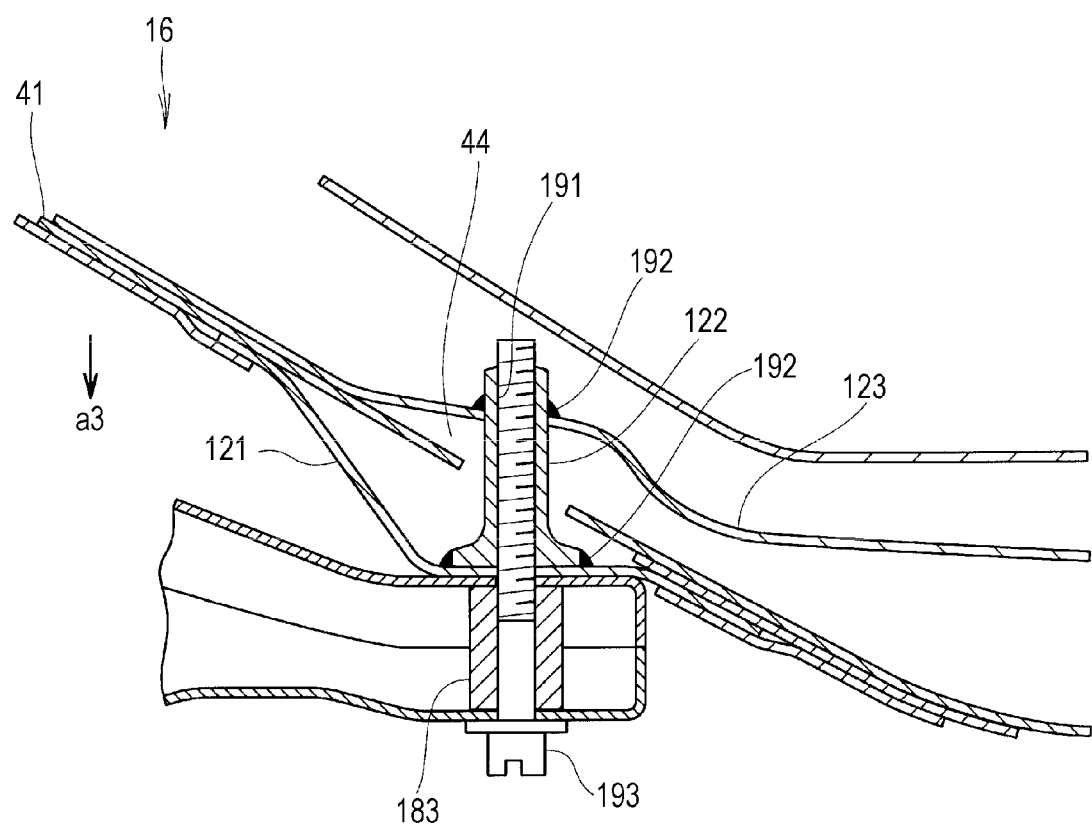
FIG. 12 is a cross-sectional view taken along line XII-XII of FIG. 11.
Figure 13:
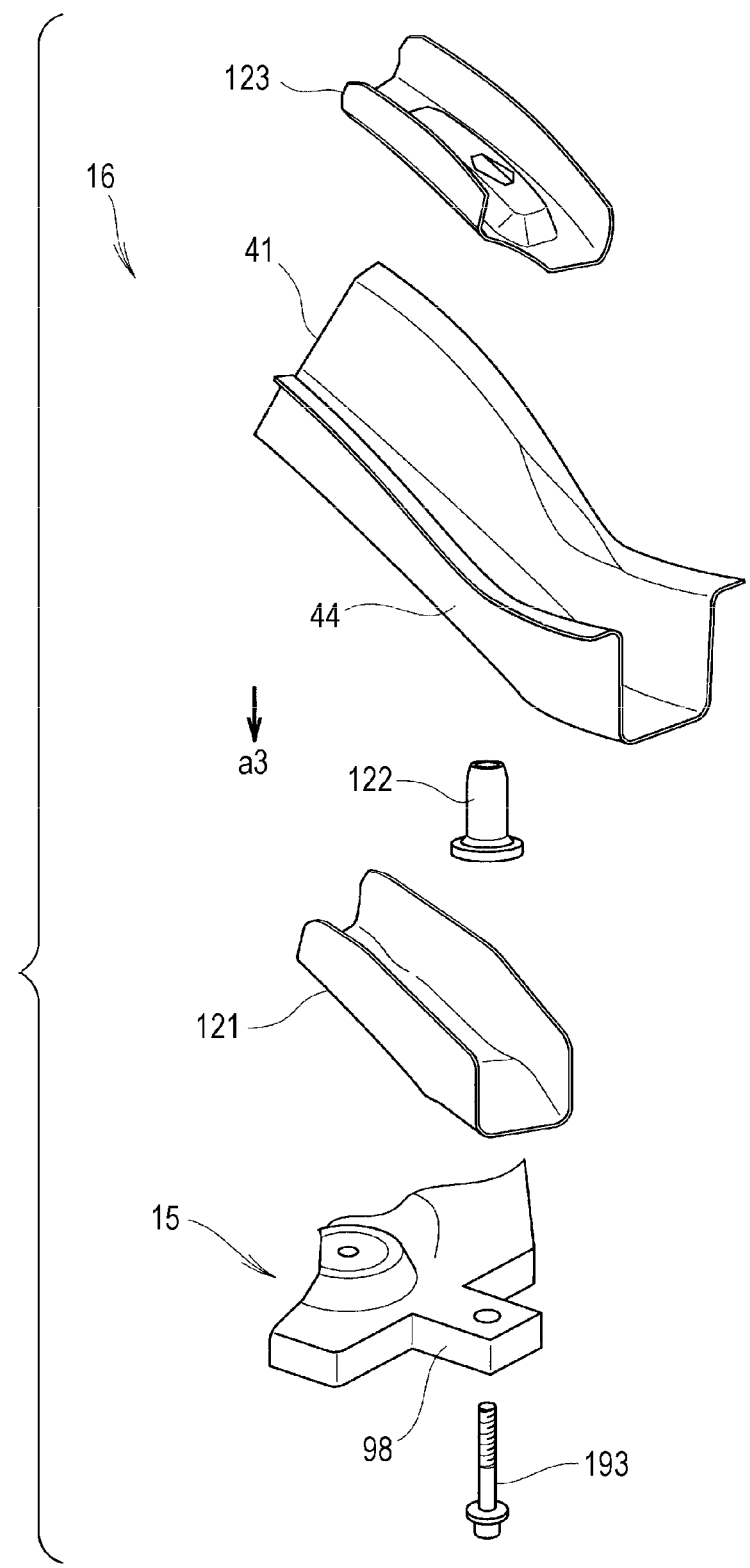
FIG. 13 is an exploded view of the front side frame.

As illustrated in FIG. 11 to FIG. 13, the rear frame fastening part 44 of each of the front side frames 16 and 17 is supported by a collar nut 122. Specifically, the collar nut 122 is vertically placed on a bracket 121 outside each of the front side frames 16 and 17 (in the direction of arrow a3) and is passed through the front floor frame 41 above the bracket 121 and a stiffener 123 inside each of the front side frames 16 and 17.

The front body 12 will now be described in detail. The front body 12 includes the subframe 15, the engine contact part 96, and the front side frames 16 and 17 described above.

The subframe 15 has front fastening parts 178 (see FIG. 6) at the left and right ends of the transverse member 103. As illustrated in FIG. 3, the front fastening parts 178 are fastened to the respective front frame fastening parts 43 of the front side frames 16 and 17. At the same time, the rear fastening parts 98 of the subframe 15 are fastened to the respective rear frame fastening parts 44 of the front side frames 16 and 17.

In plan view of the vehicle 11 (as viewed as in FIG. 6), the rear fastening parts 98 are located inside the respective rear arm connecting parts 94 (in the directions of arrows a4) within the vehicle 11. In other words, the rear fastening parts 98 are spaced from the respective rear arm connecting parts 94 by distance Wf toward the center of the vehicle 11.

In the subframe 15, as viewed from a side of the vehicle 11 (i.e., as viewed as in FIG. 15B), the rear fastening part 98 (or the center of the rear fastening part 98) is positioned lower by distance E than the rear arm connecting part 94 (or the center of the rear arm connecting part 94). Therefore, it is easy to bend a portion (i.e., a continuous part 179) between the rear arm connecting part 94 and the rear fastening part 98 into a V shape (see FIG. 15C and FIG. 15D) as necessary, for example, if the front 79 of the vehicle 11 comes into contact with an obstacle.

Figure 7B:
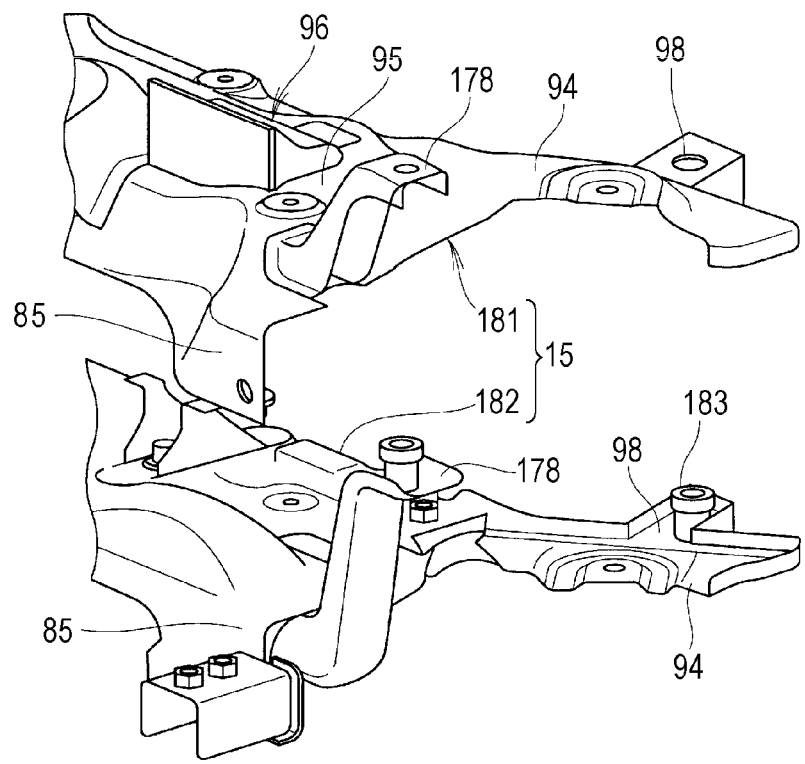
Figure 8:
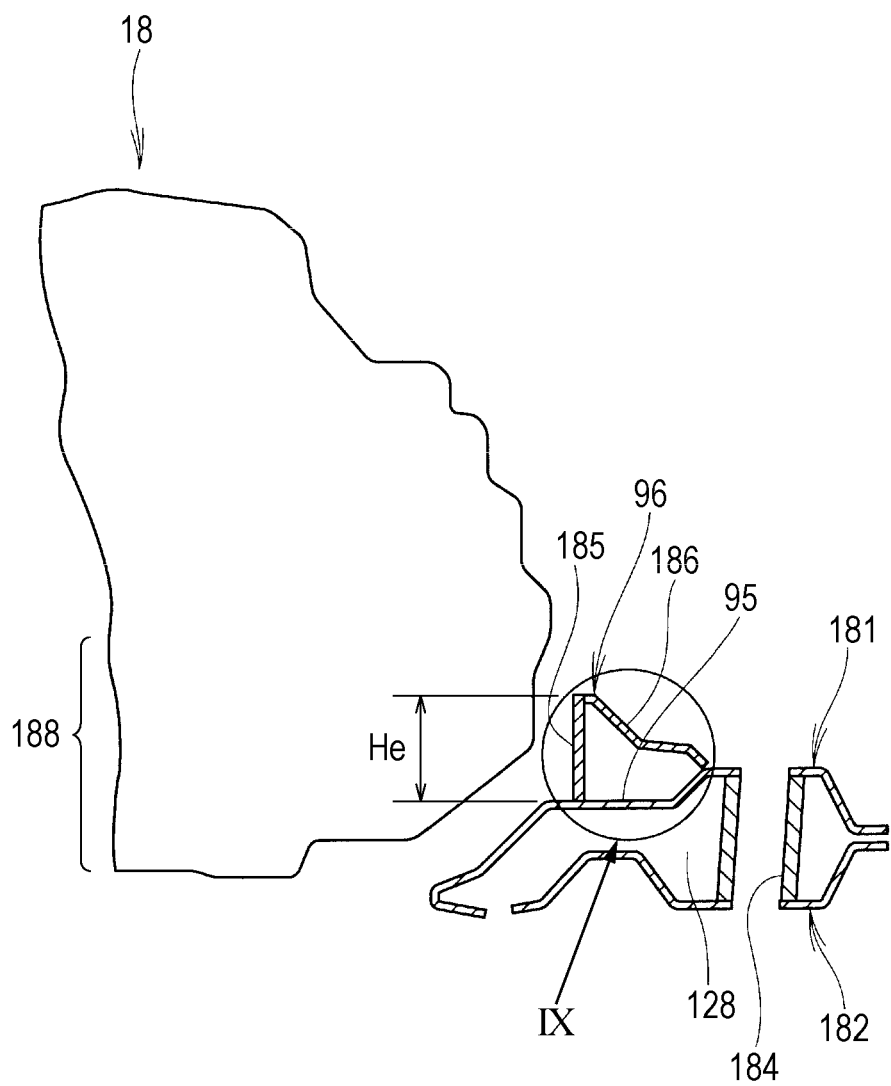
FIG. 8 is a cross-sectional view taken along line VIII-VIII of FIG. 6.

As illustrated in FIG. 7A, FIG. 7B, and FIG. 8, the subframe 15 is a hollow frame (see a hollow part 128 in FIG. 7A and FIG. 8) made of steel plates and formed by joining a lower body portion 182 to an upper body portion 181. Each rear fastening part 98 is provided with a collar 183 joined to the upper body portion 181 and the lower body portion 182. The subframe 15 is provided with holes 184 as illustrated in FIG. 6 and FIG. 8.

Figure 9:
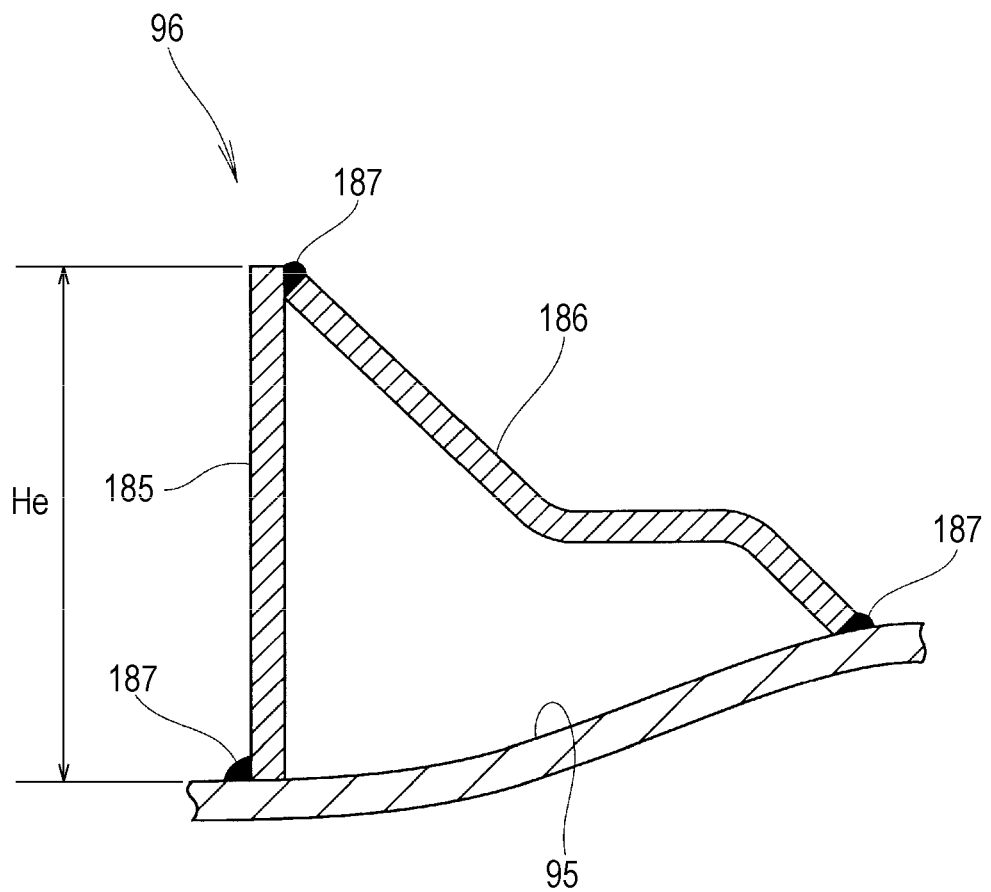
FIG. 9 is a detailed view of part IX of FIG. 8.
Figure 10:
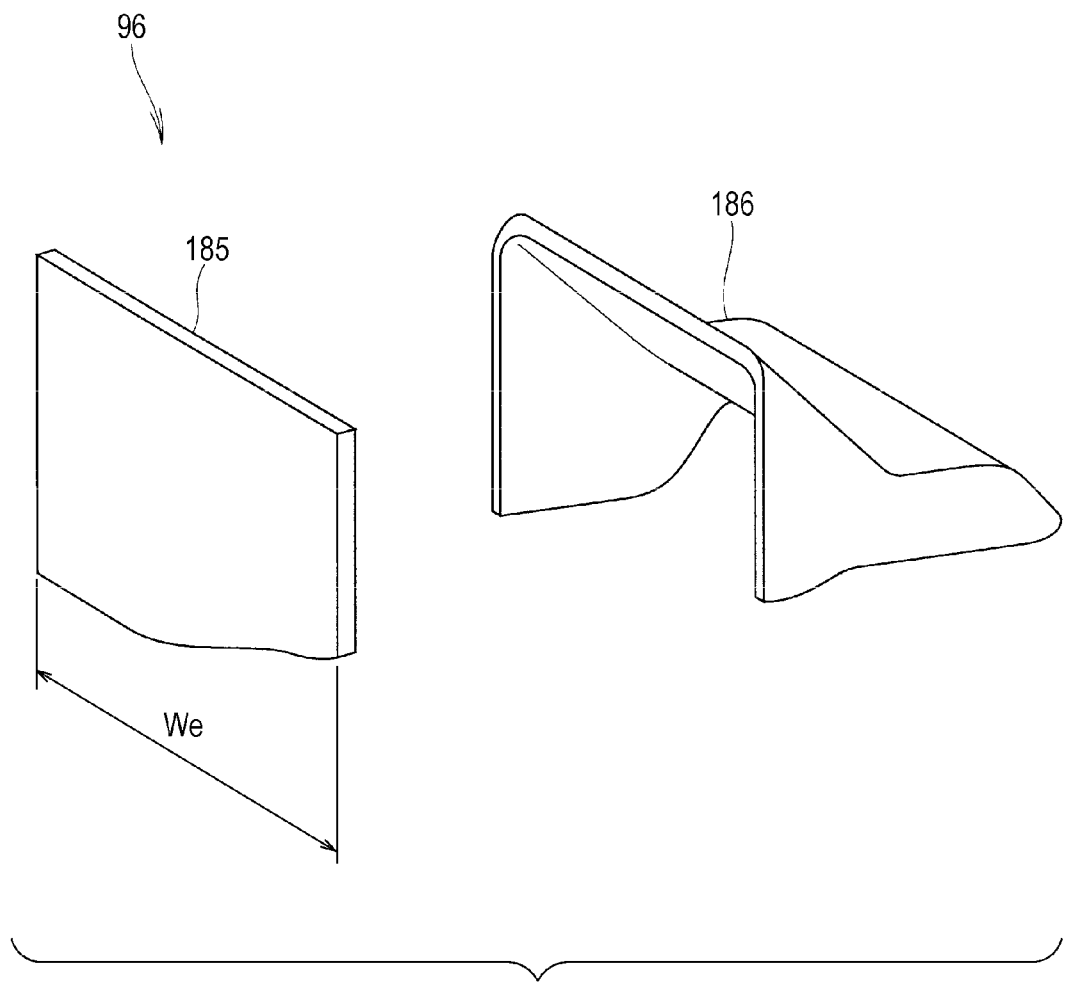
FIG. 10 is an exploded view of an engine contact part.

The engine contact part 96 is mounted at a position where the retracted engine 18 is brought into contact therewith almost simultaneously with the contact of the engine 18 with the subframe 15. As illustrated in FIG. 8 to FIG. 10, the engine contact part 96 is formed by vertically providing a contact wall 185 on the upper body portion 181 and joining a back bracket 186 to the backside of the contact wall 185. Welded portions 187 are for securing the contact wall 185 and the back bracket 186. Note that the "backside of the contact wall 185" is a backside opposite the front side with which the retracted engine 18 is brought into contact.

Height He of the engine contact part 96 is set such that the engine contact part 96 is brought into contact with a lower part 188 of the engine 18. Width We of the engine contact part 96 (in the Y-axis direction) is set to about one-seventh of the width of the subframe 15 (in the Y-axis direction). Thus, without sacrificing weight reduction, it is possible to transmit shocks (loads) to the front side frames 16 and 17 while suppressing the retraction of the engine 18.

The front side frames 16 and 17 each include the rear frame fastening part 44 in the front floor frame 41. As illustrated in FIG. 11 to FIG. 13, the collar nut 122 that extends from the bracket 121 and reaches the stiffener 123 is joined to the rear frame fastening part 44. The collar nut 122 has a female threaded portion 191 and is joined to the bracket 121 and the stiffener 123 at welded portions 192. The collar nut 122 is fastened by screwing a bolt 193 into the female threaded portion 191.

An operation of the front body 12 according to the embodiment will now be described. A shock absorbing mechanism of the front body 12 will be discussed here (see FIG. 4, FIG. 14A to FIG. 16B).

Figure 14B:
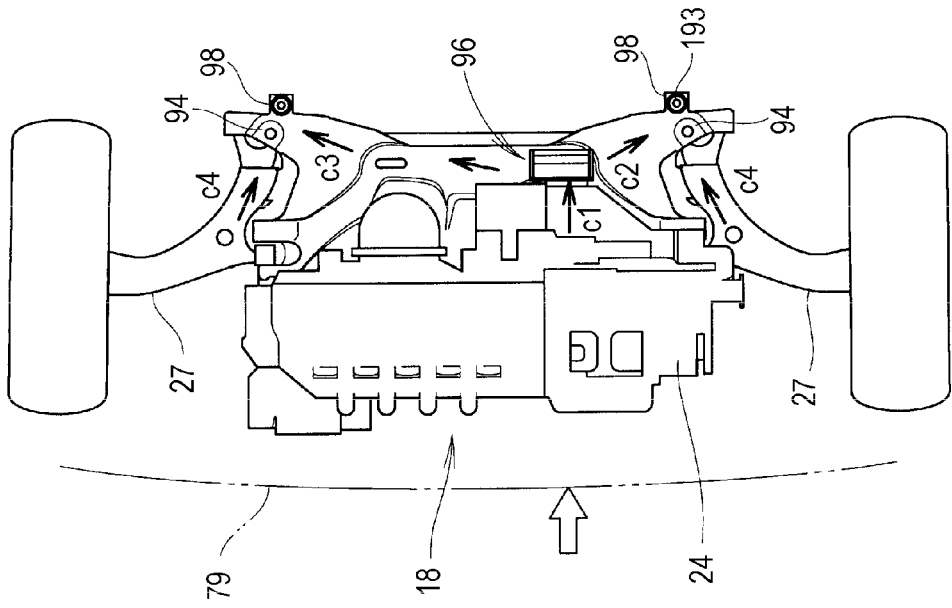
FIG. 14A and FIG. 14B are plan views illustrating a shock absorbing mechanism of the front body according to the embodiment.
Figure 14A:
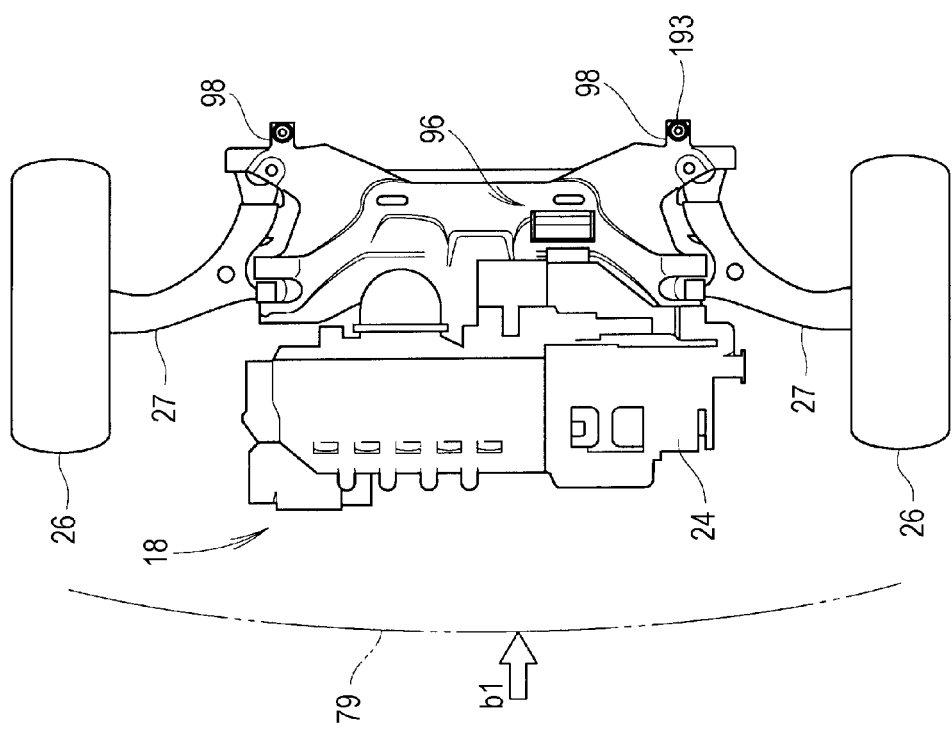
Figure 15C:
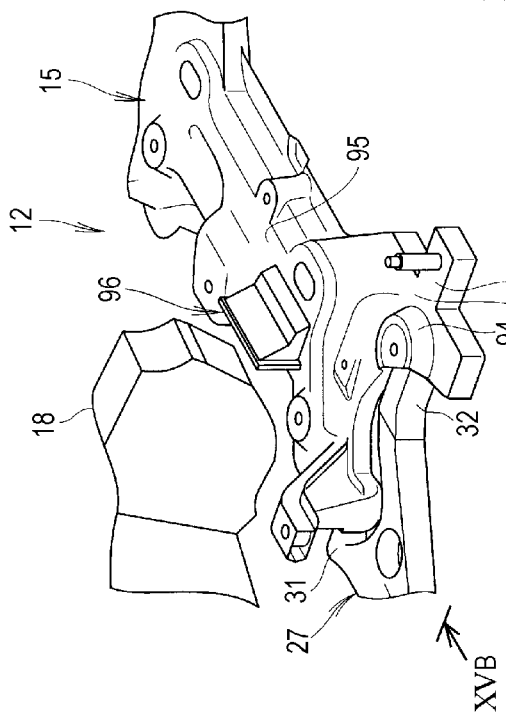
Figure 15D:
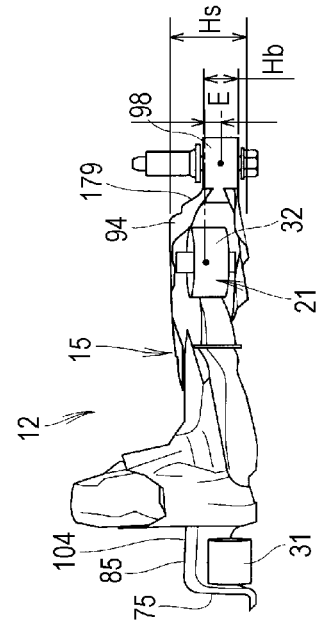

As illustrated in FIG. 14A and FIG. 14B, if an obstacle, such as an automobile, comes into contact with the front 79 of the vehicle 11, the vicinity (continuous part 179) of each rear fastening part 98 is bent as illustrated in FIG. 15D, and the bolt 193 used for the rear fastening part 98 is bent and broken, so that a shock resulting from the contact can be absorbed.

Specifically, if an obstacle comes into contact with the front 79 of the vehicle 11, the shock (load) is input to the front 79 as indicated by arrow b1 (see FIG. 14A). Then, as illustrated in FIG. 14B, FIG. 15C, and FIG. 15D, the engine 18 is retracted to come into contact with the engine contact part 96 as indicated by arrow c1 (see FIG. 14B).

When the shock (load) is input to the engine contact part 96, the load is transmitted from the engine contact part 96 to the rear fastening parts 98 on both (left and right) sides of the subframe 15 as indicated by arrow c2 and arrow c3. At the same time, the load is transmitted from the engine 18 through the lower arms 27 as indicated by arrows c4.

As a result, since the loads are concentrated on the rear fastening parts 98, the vicinity of each rear fastening part 98 (i.e., the continuous part 179 between the rear arm connecting part 94 and the rear fastening part 98) is bent into a V shape as indicated by arrow b6 (see FIG. 15D). Thus, the bolt 193 with which each rear fastening part 98 is fastened is bent by the rear fastening part 98 as indicated by arrow c5.

If the shock (load) is large, the bolt 193 is further bent and broken. That is, until immediately before the bolt 193 is broken, the subframe 15 can continue to absorb the shock and the bolt 193 can continue to transmit the load in the shearing direction (X-axis direction).

A description will now be made using a comparative example (see FIG. 16A and FIG. 16B). In the comparative example illustrated in FIG. 16A, the engine contact part 96 is used in a technique according to the related art (Japanese Unexamined Patent Application Publication No. 2009-220754).

Figure 16A:
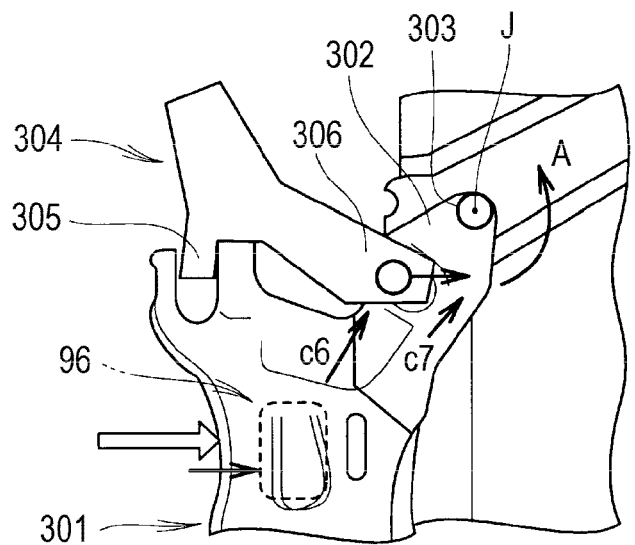
FIG. 16A and FIG. 16B are comparative views as viewed from the bottom of the vehicle.

In the comparative example illustrated in FIG. 16A, a shock (load) is transmitted as indicated by arrow c6 and arrow c7. The load is transmitted to a rear fastening part 302 of a subframe 301 such that the rear fastening part 302 is turned about axis J of a bolt 303 (i.e., about a line extending in the direction perpendicular to the plane of the drawing), that is, about the radial center of the bolt 303 in the direction of arrow A. Therefore, the shock (load) is not easily transmitted to the rear fastening part 302 and the bolt 303.

As illustrated in FIG. 16A, the engine contact part 96, and a front connecting end 305 and a rear connecting end 306 of a lower arm 304 are positioned inside the rear fastening part 302 of the subframe 301 within the vehicle 11. Therefore, the position at which the load is input is located inside the rear fastening part 302 and the bolt 303 within the vehicle 11.

Figure 16B:
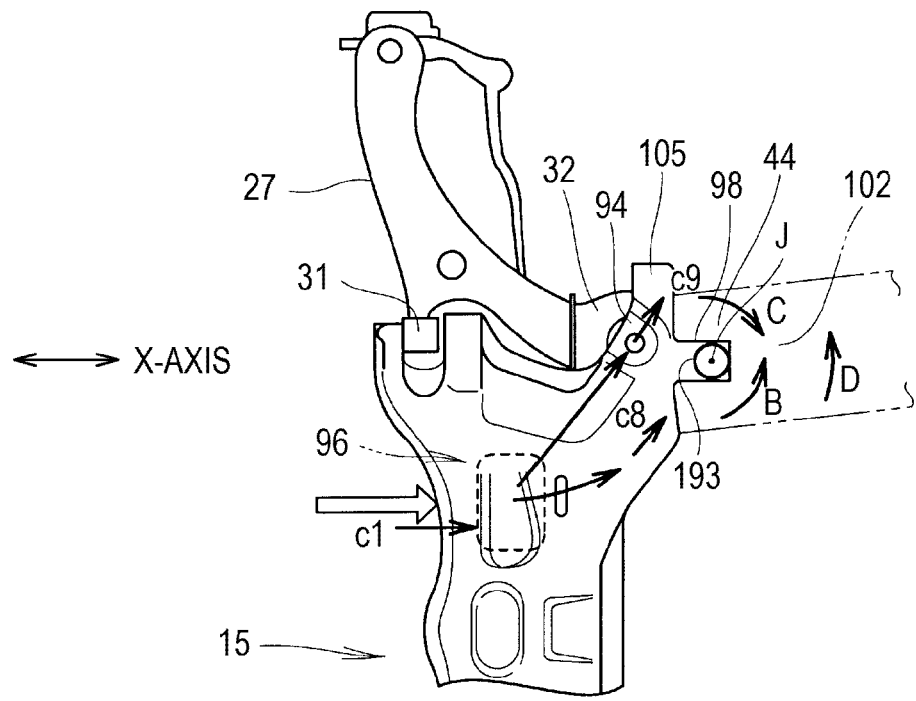

In contrast, in the embodiment illustrated in FIG. 16B, a shock (load) is transmitted to both sides of the rear fastening part 98 (i.e., to the left and right in plan view of the vehicle 11) as indicated by arrow c8 and arrow c9. The load is transmitted to the rear fastening part 98 of the subframe 15 about axis J of the bolt 193, that is, about the radial center of the bolt 193 in the direction of arrow B and also the direction of arrow C opposite the direction of arrow B. As a result, the forces that turn the rear fastening part 98 are cancelled out. Therefore, the shock (load) is transmitted to the rear fastening part 98 and the bolt 193 such that the bolt 193 is sheared (in the X-axis direction).

Specifically, since the front connecting end 31 and the rear connecting end 32 of the lower arm 27 are positioned outside the rear fastening part 98 of the subframe 15 within the vehicle 11, the load is transmitted to both sides of the rear fastening part 98 (in the directions of arrow B and arrow C) about axis J of the bolt 193 of the rear fastening part 98. Thus, since the forces that turn the subframe 15 about the rear fastening part 98 are cancelled out, a force can be applied to the bolt 193.

In the front body 12, when a load is transmitted to both sides of the rear fastening part 98 of the subframe 15 as indicated by arrow c8 and arrow c9, it is possible to transmit the shock (load) from the rear fastening part 98 through the bolt 193 (in the X-axis direction) to the rear frame fastening part 44 and the branched part 102 without applying a turning force to the rear fastening part 98 (in the direction of arrow D).

Then, as illustrated in FIG. 4, the rear frame fastening part 44 and the branched part 102 can distribute the shock (load) to the floor center frame 54 as indicated by arrow b8 and to the floor frame 55 as indicated by arrow b9. This can improve the strength of the rear frame fastening part 44, make it possible to firmly hold the collar nut 122, and allow the rear frame fastening part 44 and the retracted rear fastening part 98 to easily break the bolt 193.

The front body of the vehicle according to the present invention is suitable for use in automobiles.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

What is claimed is:

1. A front body of a vehicle, comprising:
left and right front side frames extending continuously or from the front body of the vehicle to a cabin of the vehicle; and
a subframe disposed in front of a floor of the cabin, extending to the left and right, and attached to the left and right front side frames,
wherein the subframe includes front arm connecting parts and rear arm connecting parts configured to support lower arms of respective suspensions at left and right ends of the subframe, an engine contact part protruding upward from an upper surface of the subframe and facing toward an engine inside the front body, and rear fastening parts each disposed between the engine contact part and the corresponding rear arm connecting part and fastened to the corresponding front side frame,
wherein the respective rear fastening parts are positioned at a rear of the engine contact part with respect to a vehicle longitudinal direction and positioned outer in a vehicle width direction than the engine contact part, and
wherein the respective rear fastening parts are positioned at a rear of a corresponding one of the rear arm connecting parts with respect to the vehicle longitudinal direction and positioned inner in the vehicle width direction than the corresponding one of the rear arm connecting parts.

2. The front body according to claim 1, wherein the front side frames include respective frame fastening parts to which the respective rear fastening parts are fastened, the frame fastening parts being connected to respective branched parts extending to the left and right of the vehicle.

3. The front body according to claim 1,
wherein the subframe includes a transverse member extending to the left and right in plan view of the vehicle, a front branch member and a rear branch member extending from each of the left and right ends of the transverse member, the front branch member and the rear branch member extending to the front and rear, respectively, of the vehicle to form a Y shape;
wherein each of the rear arm connecting parts is formed in the corresponding rear branch member; and
wherein each of the rear fastening parts is formed in a branch part disposed between the corresponding rear arm connecting part and the engine contact part and protruding from the corresponding rear branch member toward the rear of the vehicle.

4. The front body according to claim 3, wherein in the subframe, a height of a cross section of the rear fastening parts is lower than a height of a cross section of the rear arm connecting parts.

5. The front body according to claim 1, wherein the frame fastening part of each of the front side frames is supported by a collar nut vertically placed on a bracket outside the front side frame, the collar nut being passed through a front floor frame above the bracket and a stiffener inside the front side frame.

* * * * *